US007959711B2

(12) United States Patent
Saukaitis et al.

(10) Patent No.: US 7,959,711 B2
(45) Date of Patent: Jun. 14, 2011

(54) GAS SEPARATION MEMBRANE SYSTEM AND METHOD OF MAKING THEREOF USING NANOSCALE METAL MATERIAL

(75) Inventors: John Charles Saukaitis, Katy, TX (US); Alan Anthony Del Paggio, Spring, TX (US)

(73) Assignee: Shell Oil Company, Houston, TX (US)

( * ) Notice: Subject to any disclaimer, the term of this patent is extended or adjusted under 35 U.S.C. 154(b) by 512 days.

(21) Appl. No.: 11/932,223

(22) Filed: Oct. 31, 2007

(65) Prior Publication Data

US 2008/0174040 A1 Jul. 24, 2008

Related U.S. Application Data

(60) Provisional application No. 60/864,890, filed on Nov. 8, 2006.

(51) Int. Cl.
*B01D 53/22* (2006.01)
*B01D 67/00* (2006.01)
*B01D 71/02* (2006.01)

(52) U.S. Cl. ................. 95/55; 95/45; 95/56; 96/4; 96/8; 96/10; 96/11; 55/523; 55/524; 55/DIG. 5; 427/319; 427/376.7; 427/376.8; 427/383.3; 427/404

(58) Field of Classification Search ................ 95/45, 55, 95/56; 96/4, 8, 10, 11; 55/523, 524, DIG. 5; 427/304, 318, 319, 376.6, 376.7, 376.8, 383.3, 427/404
See application file for complete search history.

(56) References Cited

U.S. PATENT DOCUMENTS

| | | | | |
|---|---|---|---|---|
| 5,215,729 | A * | 6/1993 | Buxbaum | 95/56 |
| 5,393,325 | A * | 2/1995 | Edlund | 95/56 |
| 6,468,605 | B2 * | 10/2002 | Shah et al. | 427/600 |
| 6,649,559 | B2 * | 11/2003 | Drost et al. | 95/56 |
| 6,761,755 | B2 * | 7/2004 | Jantsch et al. | 96/11 |
| 6,964,697 | B2 * | 11/2005 | Pan et al. | 96/11 |
| 7,018,446 | B2 * | 3/2006 | Alvin et al. | 95/56 |
| 7,045,015 | B2 | 5/2006 | Renn et al. | 118/686 |
| 7,749,305 | B1 * | 7/2010 | Bossard et al. | 95/55 |
| 2004/0137209 | A1 * | 7/2004 | Zeller et al. | 428/304.4 |
| 2004/0237779 | A1 * | 12/2004 | Ma et al. | 95/55 |
| 2004/0237780 | A1 | 12/2004 | Ma et al. | 95/55 |
| 2004/0244589 | A1 * | 12/2004 | Bossard et al. | 96/11 |
| 2004/0244590 | A1 | 12/2004 | Ma et al. | 96/11 |
| 2006/0008590 | A1 * | 1/2006 | King et al. | 427/421.1 |
| 2006/0016332 | A1 | 1/2006 | Ma et al. | 95/55 |
| 2007/0098883 | A1 * | 5/2007 | Itoh et al. | 427/180 |
| 2007/0251389 | A1 * | 11/2007 | Katsir et al. | 96/11 |
| 2007/0287237 | A1 * | 12/2007 | Rockenberger et al. | 438/163 |
| 2008/0014355 | A1 * | 1/2008 | Chao et al. | 427/304 |
| 2010/0005969 | A1 * | 1/2010 | Vanderspurt et al. | 96/11 |

FOREIGN PATENT DOCUMENTS

| | | | |
|---|---|---|---|
| JP | 2001145824 | | 5/2001 |
| JP | 2004-216275 | * | 8/2004 |
| JP | 2004216275 | | 8/2004 |
| WO | WO2004054625 | | 7/2004 |
| WO | WO2008041969 | | 4/2008 |

* cited by examiner

*Primary Examiner* — Jason M Greene
(74) *Attorney, Agent, or Firm* — Charles W. Stewart

(57) ABSTRACT

A method of manufacturing such gas separation membrane system that includes applying to a surface of a porous substrate a layer of a nanopowder of a gas-selective metal and, thereafter, heat-treating the resultant surface treated porous substrate to yield a heat-treated and surface-treated porous substrate suitable for use as a gas separation membrane system.

38 Claims, 1 Drawing Sheet

Figure 1:
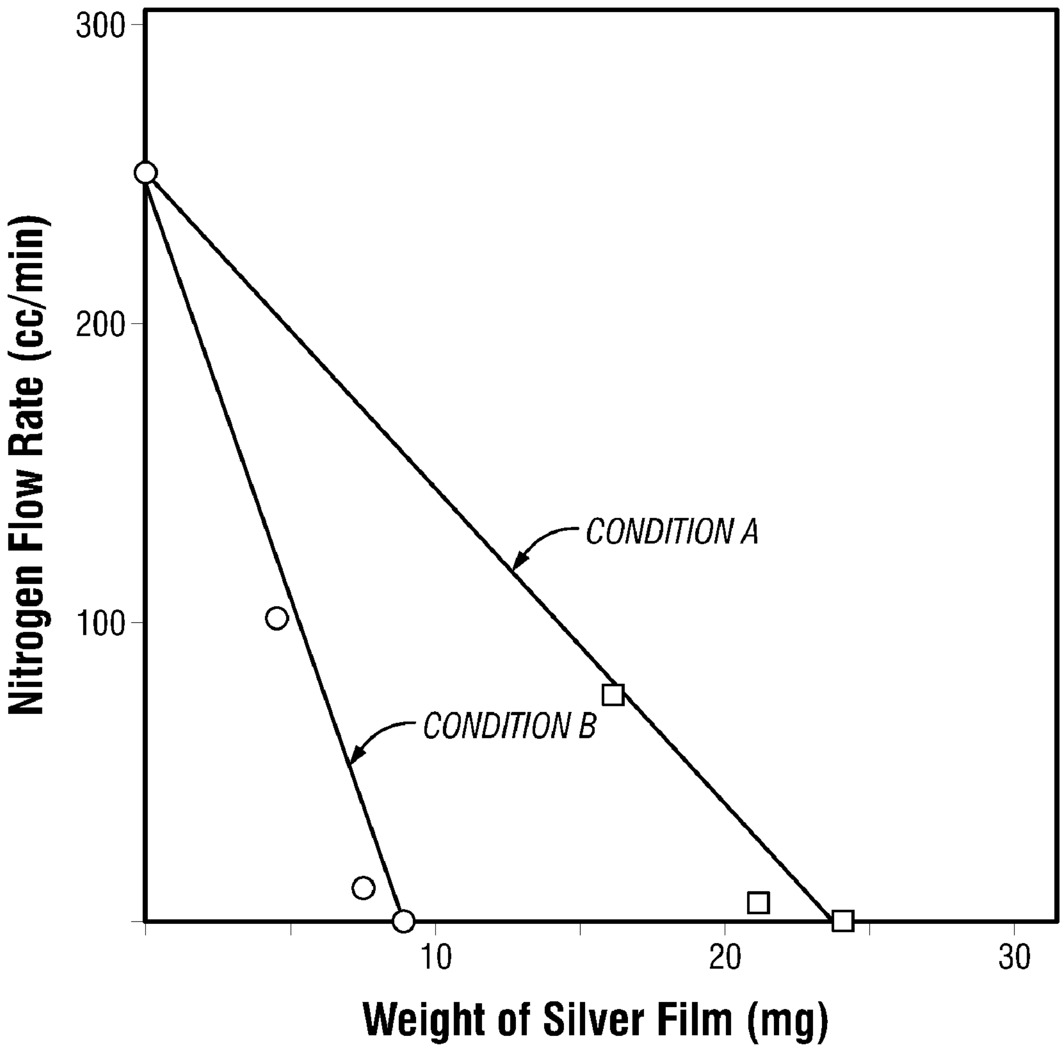

GAS SEPARATION MEMBRANE SYSTEM AND METHOD OF MAKING THEREOF USING NANOSCALE METAL MATERIAL

This application claims the benefit of U.S. Provisional Application Ser. No. 60/864,890, filed Nov. 8, 2006.

This invention relates to a gas separation membrane system and a method of making such a gas separation membrane system using nanosized material.

US 2004/0237780 discloses a gas separation module for the selective separation of hydrogen gas from a hydrogen gas-containing gaseous stream that is made by first depositing a gas-selective metal onto a porous substrate followed by polishing the resultant coated substrate and, thereafter, depositing a second layer of a gas-selective metal on the coated polished porous substrate. Techniques mentioned for depositing the gas-selective metal include electroless plating, thermal deposition, chemical vapor deposition, electroplating, spray depositon, sputter coating, e-beam evaporation, ion beam evaporation and spray pyrolysis. It is noted that in the teachings of US 2004/0237780 the manufacture of its composite gas separation module is required to include an intermediate step of abrading or polishing of a coated substrate to remove unfavorable morphologies followed by a second coating step for depositing a second material such as a gas-selective metal. There is no mention in the publication of the use of nanopowders of metals to coat a porous substrate or of the elimination of the polishing step in the manufacture of the gas separation module. Also, the publication does not disclose the heat treating of a porous substrate that is coated with a layer of metal nanopowder followed by the coating thereof with a gas selective material without an intermediate polishing step.

US 2004/0237779 discloses a gas separation module for the selective separation of hydrogen gas from a hydrogen gas-containing gaseous stream that includes a porous metal substrate upon which is an intermediate porous metal overlayer upon which is a dense hydrogen-selective membrane. The metal of the intermediate porous metal overlayer can include palladium and a Group IB metal, in one or more layers, including alternating layers, of one or more of the metals. The intermediate porous metal layer can be applied over the porous metal substrate by an electroless plating method. It is taught that the intermediate porous metal layer can improve adhesion of the dense gas-selective membrane to the porous metal substrate and that it can serve to protect against intermetallic diffusion between the porous metal substrate and dense gas-selective membrane. In a number of the mentioned embodiments, the intermediate porous metal layer is not significantly less porous to helium flux than the porous substrate. Thus, because the intermediate porous metal layer can be as porous or more porous than the porous metal substrate upon which it is deposited, and, due to it having the functions of providing a barrier to intermetallic diffusion and improved dense gas-selective membrane adhesion, it appears that the intermediate porous metal layer has such significant porosity that it does not, however, function as a gas selective membrane metal such as is used for the dense gas-selective membrane. There is no mention of the use of nanopowders of metals or metal alloys or alloyable nanopowders in the application of a layer of a gas-selective material upon the porous metal substrate. There is also no mention of the use of heat-treating of a porous substrate that has had its surface treated with a nanopowder of a gas-selective metal.

US 2004/0244590 discloses a gas separation module for the selective separation of hydrogen gas from a hydrogen gas-containing gaseous stream that includes a porous metal substrate upon which is an intermediate layer of a powder that has a Tamman temperature that is higher than the Tamman temperature of the porous metal substrate. The Tamman temperature of a material is defined as the temperature that is one-half the melting temperature of the material in degrees Kelvin. The intermediate layer is overlaid with dense hydrogen-selective membrane. The publication teaches that the intermediate layer can protect against intermetallic diffusion between the porous metal substrate and the dense hydrogen-selective membrane and that the intermediate layer can improve adhesion of the dense gas-selective membrane to the porous metal substrate. In one of the embodiments taught by the publication, the intermediate layer is not significantly less porous to helium flux than the porous substrate. Thus, because the intermediate porous metal layer can be as porous or more porous than the porous metal substrate upon which it is deposited, and, due to it having the functions of providing a barrier to intermetallic diffusion and improved dense gas-selective membrane adhesion, it appears that the intermediate porous metal layer has such significant porosity that it does not function as a gas-selective membrane metal such as is used for the dense gas-selective membrane. There is no explicit mention of a requirement that the powder of the intermediate layer is required to be a nanopowder. Also, there is no mention of the use of heat-treating of a porous substrate that has had its surface treated with a nanopowder of a gas-selective metal nor is there any mention of the application of low-temperature alloyable metal nanopowders to the surface of the porous substrate.

There is a need to provide for more efficient or economical methods for manufacturing gas separation membrane systems that either utilize fewer manufacturing steps or steps that are more economically advantageous to use than alternative manufacturing steps. It is further desirable to provide improved gas separation membrane systems that use less or more effectively use precious metals in the manufacture thereof.

Thus, accordingly, provided is a method of making a gas separation membrane system, wherein said method comprises: applying to a surface of a porous substrate a nanopowder, comprising nanoparticles of a gas-selective metal, to provide a surface treated porous substrate; and heating said surface treated coated porous substrate to thereby provide a heat treated surface treated porous substrate that is suitable for use as said gas separation membrane system.

Another invention is a gas separation membrane system, comprising: a porous substrate, having a surface that is treated with a layer of a nanopowder, wherein said nanopowder comprises nanoparticles of a gas-selective metal, to thereby provide a surface-treated porous substrate, and wherein said surface-treated porous substrate is heat-treated to provide said gas separation membrane system.

In still another invention is a process for separating hydrogen from a hydrogen-containing gas stream, wherein said process comprises: passing said hydrogen-containing gas stream over a gas separation membrane system, comprising a porous substrate, having a surface that is treated with a layer of a nanopowder, wherein said nanopowder comprises nanoparticles of a gas-selective metal, to thereby provide a surface-treated porous substrate, and wherein said surface-treated porous substrate is heat-treated to provide said gas separation membrane system, under temperature and pressure conditions such that hydrogen from said hydrogen-containing gas stream selectively passes through said gas separation membrane system.

FIG. 1 presents two plots of $N_2$ gas leakage rate as a function of the total metal layer thickness that is provided by gas separation modules that have various total deposited metal by the deposition of one or more layers of nanopowder or nanoparticles that have been applied to a porous substrate using either a thick layer deposition condition (Condition A) or a thin layer deposition condition (Condition B).

The invention relates to a gas separation membrane system comprising a porous substrate that has been surface treated with a layer of metal or metal alloy or alloyable metal nanopowder or nanoparticles and thereafter heat-treated. The invention further relates to a method of making such a gas separation membrane system by applying directly to the surface of a porous substrate a layer of a nanopowder or nanoparticles of a gas-selective metal or metal alloy or alloyable metal to thereby provide a surface treated porous substrate that is thereafter heat-treated. The surface treated porous substrate that has been heat-treated may be used as a gas separation system or it may further be modified by coating it with an overlayer of a gas-selective material to thereby provide a surface treated porous substrate that has been both heat-treated and coated with an additional overlayer of a gas-selective material.

The porous substrate of the invention may include any porous material that is permeable by hydrogen and is suitable for use as a support for the layer of metallic (e.g. a metal, a metal alloy, or an alloyable metal or metal mixture) nanopowder or nanoparticles.

In a preferred embodiment of the invention, the porous substrate includes a porous foundation or porous support structure that is overlaid with a porous intermetallic diffusion barrier layer. This porous intermetallic diffusion barrier layer sits directly upon the surface of the porous foundation and is sandwiched between the layer of metallic nanopowder or nanoparticles and the porous foundation, or, in other words, the layer of metallic nanopowder or nanoparticles is deposited upon the surface of the intermetallic diffusion barrier layer as an overlayer.

The porous substrate may be of any shape or geometry provided that it has a surface that permits the application thereto of the layer of metallic nanopowder or nanoparticles or the deposition of an additional overlayer coating of a gas-selective material. Such shapes can include planar or curvilinear sheets of the porous metal material having an undersurface and a top surface that together define a sheet thickness, or the shapes can be tubular, such as, for example, rectangular, square and circular tubular shapes that have an inside surface and an outside surface that together define a wall thickness and with the inside surface of the tubular shape defining a tubular conduit.

The porous foundation or porous support structure can include any suitable porous metal material selected from any of the materials known to those skilled in the art including, but not limited to, the stainless steels, such as, for example, the 301, 304, 305, 316, 317, and 321 series of stainless steels, the twenty or more HASTELLOY® alloys, for example, HASTELLOY® B-2, C-4, C-22, C-276, G-30, X and others, and the INCONEL® alloys, for example, INCONEL® alloy 600, 625, 690, and 71. The porous metal material, thus, can comprise an alloy that is hydrogen permeable and which comprises chromium, and, preferably, further comprises nickel. The porous metal material may further comprise an additional alloy metal selected from the group consisting of iron, manganese, molybdenum, tungsten, cobalt, copper, titanium, zirconium, aluminum, carbon, and any combination thereof.

One particularly desirable alloy suitable for use as the porous metal material can comprise nickel in an amount in the range of upwardly to about 70 weight percent of the total weight of the alloy and chromium in an amount in the range of from 10 to 30 weight percent of the total weight of the alloy. Another suitable alloy for use as the porous metal material comprises nickel in the range of from 30 to 70 weight percent, chromium in the range of from 12 to 35 weight percent, and molybdenum in the range of from 5 to 30 weight percent, with these weight percents being based on the total weight of the alloy. The Inconel alloys are preferred over other alloys.

The intermetallic diffusion barrier layer serves to inhibit the diffusion of metal from the porous metal material of the porous foundation of the porous substrate to the layer of metallic nanopowder or nanoparticles formed on the surface of the porous substrate. Examples of possible materials that may suitably be used as the intermetallic diffusion barrier include alumina, silica, zirconia, titania, ceria, silicon carbide, chromium oxide, ceramic materials, zeolites, and the highly refractory metals, such as, tungsten, tantalum, rhenium, osmium, iridium, niobium, ruthenium, hafnium, zirconium, vanadium, chromium and molybdenum.

The thickness (e.g. wall thickness or sheet thickness, both as described above), porosity, and pore size distribution of the pores of the porous substrate, including the porous foundation and the intermetallic diffusion barrier layer, are properties of the porous substrate selected in order to provide a gas separation membrane system of the invention that has the desired performance characteristics and other desired properties and is as otherwise required for the manufacture of the gas separation membrane system of the invention. It is understood that, as the thickness of the porous substrate increases, when it is used in hydrogen separation applications, the hydrogen flux will tend to decrease. The operating conditions, such as pressure, temperature and fluid stream composition, may also impact the hydrogen flux. But, in any event, it is desirable to use a porous substrate having a reasonably small thickness so as to provide for a high gas flux therethrough.

The thickness of the porous substrate for the typical application contemplated hereunder can be in the range of from about 0.05 millimeter (mm) to about 25 mm, but, preferably, the thickness is in the range of from 0.1 mm to 12.5 mm, and, more preferably, from 0.2 mm to 5 mm.

The thickness of the intermetallic diffusion barrier layer, if present, can be in the range upwardly to about 10 micrometers (μm). It is preferred for the thickness of the intermetallic diffusion barrier layer to be as small as is feasible, and, thus, it may be in the range of from 0.01 μm to 10 μm, and, preferably, from 0.01 μm to 5 μm.

The porosity of the porous substrate, including the porous metal material of the porous foundation and, if present, the intermetallic diffusion barrier material of the intermetallic diffusion barrier layer, can be in the range of from 0.01 to 0.5. The term porosity, as used herein, is defined as the proportion of non-solid volume to the total volume (i.e. non-solid and solid) of the porous metal substrate material. A more typical porosity is in the range of from 0.05 to 0.3.

The pore size distribution of the pores of the porous metal material of the porous foundation, and, if present, of the pores of the intermetallic diffusion barrier material of the intermetallic diffusion barrier layer, can vary with the median pore diameter typically being in the range of from about 0.1 μm to about 15 μm. More typically, the median pore diameter is in the range of from 0.2 μm to 10 μm, and, most typically, from 0.3 μm to 5 μm.

The application of a layer of a nanopowder or nanoparticles of a gas-selective metal or metal alloy or alloyable metal or alloyable metal mixture (nanopowder(s)) to the surface of the porous substrate of the gas separation membrane system is an essential aspect of the invention. The use of the nanopowder, as opposed to micron-sized powders, provides manufacturing benefits over prior art manufacturing techniques. For instance, due to the unique properties of the nanopowders used to treat the surface of the porous substrate, the temperatures needed to sinter the nanopowder is lower than would otherwise be required with the use of micron-sized powders. And, when the nanopowder that is applied to the surface of the porous substrate is a mixture of alloyable metals, such as, for example, the metals of palladium, platinum, gold and silver, a lower temperature is required to cause the formation of the alloy than would otherwise be necessary if the metal particles were not in the nanosize range such as metal particles that are micron-sized or larger.

When referring herein to a nanopowder, what is meant is that the nanopowder is an ultra-finely divided metal or metal alloy or mixture of an alloyable metal powder composed of nanoparticles of the metal or metal alloy or mixture of alloyable metals. A nanopowder, thus, is composed of nanoparticles of sub-micron size, or nano-size, having an average particle size of less than 400 nanometers ($10^{-9}$ meters, i.e., nm), and, that, typically, are in the size range of from 1 to 300 nanometers. A micron-sized particle would typically be larger than about 0.5 micrometers.

Certain of the teachings of the prior art suggest that metal powders composed of micron-sized particles may be used in forming an intermediate layer of a composite gas separation module; however, in the inventive gas separation membrane system and its manufacture, it is not desirable to use metal powders that include larger particles in the micron-sized range. But, instead, it is a desirable aspect of the invention for the nanopowder to be made up of particles having an average particle size in the range of from 2 to 250 nanometers (nm). It is preferred, however, for the nanopowder to comprise nano-sized particles having an average particle size in the range of from 3 to 150 nm, and, more preferably, from 5 to 100 nm. It can be especially advantageous for the nanopowder to comprise nanosized particles having an average particle size of less than 80 nm and, even, less than 50 nm or even less than 30 nm.

The nanopowder of the invention is, preferably, that of a metal or a metal alloy or a mixture of metals that are both gas-selective and alloyable under the heat treatment conditions as discussed herein. What is meant by being gas-selective is that the metal or metal alloy or mixture of alloyable metals is selectively permeable to a gas, and, thus, when placed as a layer upon the surface of the porous substrate, is capable of functioning so as to selectively allow the passage of a selected gas through the layer while preventing the passage of other gases. It is preferred for the gas-selective metal to be hydrogen-selective by selectively providing for the passage of hydrogen while preventing the passage of other gases.

Possible gas-selective metals or materials include those selected from the group of metals consisting of platinum (Pt), palladium (Pd), gold (Au), silver (Ag), niobium (Nb), iridium (Ir), rhodium (Rh), ruthenium (Ru) and alloys of such metals. For hydrogen gas separation membrane systems, it is preferred for the gas-selective material to be a hydrogen-selective metal such as platinum, palladium, gold, silver, and combinations thereof, including alloys. The preferred hydrogen-selective alloys include alloys of palladium and silver, or platinum and silver, or gold and silver, or combinations of any two or more of palladium, platinum, gold and silver.

In certain embodiments of the invention, it is important for the nanopowder to be a low temperature alloyable metal nanopowder. What is meant by low temperature alloyable metal nanopowder is that the nanopowder comprises nanoparticles of at least two gas-selective metals that are transformed into an alloy comprising the at least two gas-selective metals when heated under the temperature conditions as described herein. Suitable low temperature alloyable metal nanopowders include nanopowder mixtures comprising palladium and silver, or platinum and silver, or gold and silver. These nanopowder mixtures are of particular importance in that the presence of silver provides for a lowering of the melting temperature range of the platinum, palladium or gold that, in combination with the silver, forms the metal alloy.

The palladium and silver nanopowder mixture can contain palladium in an amount in the range of from 50 to 99 weight percent of the total weight of the palladium and silver of the palladium and silver nanopowder mixture and silver in an amount in the range of from 1 to 50 weight percent of the total weight of the palladium and silver of the palladium and silver nanopowder mixture. The preferred amount of palladium in the palladium and silver nanopowder mixture is in the range of from 60 to 95 weight percent, and, most preferred, from 70 to 90 weight percent of the total weight of palladium and silver of the nanopowder mixture. The preferred amount of silver in the palladium and silver nanopowder mixture is in the range of from 5 to 40 weight percent, and, most preferred, from 10 to 30 weight percent of the total weight of palladium and silver of the nanopowder mixture. An especially preferred palladium-silver alloyable nanopowder or metal alloy particle contains from 75 to 80 weight percent palladium and from 20 to 25 weight percent silver.

Instead of being a mixture of nanoparticles of at least two gas-selective metals, the nanopowder can also comprise nanoparticles of a metal alloy of either palladium and silver, or platinum and silver, or gold and silver, or a combination of two or more of palladium, platinum, gold and silver.

It can be an important aspect of the invention for the nanopowder of metal alloy to have a low melting temperature. For instance, one embodiment of the invention utilizes a layer of a nanopowder having a Tamman temperature that is lower than or less than the Tamman temperature of the porous substrate upon which the nanopowder is supported. As used herein, the term Tamman temperature of a material, such as the nanopowder and porous substrate material, refers to the temperature that is one-half the melting temperature, in degrees Kelvin, of the particular material of concern. A definition of the term Tamman temperature along with a presentation of the Tamman temperatures of various materials are presented in US publication no. US 2004/0244590, which publication is incorporated herein by reference.

In the manufacture of the gas separation membrane system of the invention, the layer of nanopowder is applied to the surface of the porous substrate by any suitable method known to those skilled in the art for applying a nanopowder to a porous surface to thereby provide the surface treated porous substrate. For instance, the nanopowder may be applied to the surface of the porous substrate by transport with a gas, or by the application to the surface of the porous substrate of a nanoparticle dispersion wherein such dispersion is a liquid suspension containing the nanoparticles dispersed within a liquid medium such as water or a hydrocarbon, or by the application of a paste comprising a liquid dispersion of nanoparticles, or by the application of the nanopowder using any other suitable method known to those skilled in the art.

Examples of methods that may be used for applying the layer of nanopowder to the surface of the porous support, include, for example, non-digital application methods, such as, screen-printing, gravure coating, spraying and microstamping, and, digital application methods, such as, spray jet, valve jet, and inkjet printing techniques. Among these methods, inkjet printing is particularly suitable and is described in Kirk-Othmer Encyclopedia of Chemical Technology, Fouth Edition (1996), volume 20, John Wiley and sons, New York, pp 112-117.

One specific example of a method that may suitably be used in the application of the layer of nanopowder to the surface of the porous substrate is a method that includes the steps of aerosolizing or atomizing a suspension or dispersion of nanoparticles of the gas-selective metal within a liquid solvent such as water or a hydrocarbon; combining a flow stream of the thus-formed aerosol with an annular sheath gas flow; passing the thus-combined aerosol and flow stream through an extended nozzle; and focusing the thus-combined aerosol and flow stream upon the surface of the porous substrate to thereby apply the nanopowder to the surface. A more specific description of such an application method is described in detail in U. S. Patent Application Publication No. US 2006/0008590 and in U.S. Pat. No. 7,045,015, both of which are incorporated herein by reference.

The application temperature at which the layer of nanopowder is applied to the porous substrate is, generally, less than the heat treatment or sintering temperature, as described elsewhere herein, and can be in the range of from 10° C. to 250° C. The preferred application temperature of the nanopowder to the porous substrate is in the range of from 20° C. to 200° C., and, most preferably, from 25° C. to 180° C. Thus, during the application of the nanopowder to the porous substrate, the temperature of the porous substrate is maintained at a temperature that is essentially within the application temperature range.

The amount of the nanopowder that is applied to the surface of the porous substrate should be such as to fill, at least partially, the pores of the outer surface of the porous substrate, and, thus, provide a layer of the nanopowder upon the surface of the porous substrate to thereby provide the surface treated porous substrate. It is desirable for this layer to have a thickness greater than 3 nm (0.003 μm), and thus, can be in the range of from 3 nm (0.003 μm) to 15 μm, but more specifically, the thickness is in the range of from 5 nm (0.005 μm) to 10 μm. Most specifically, the nanopowder layer thickness of the layer of nanopowder that is applied to the surface of the porous substrate is in the range of from 10 nm (0.010 μm) to 10 μm.

Once the layer of nanopowder is applied to the surface of the porous substrate, the resulting surface treated porous substrate is heat treated to sinter the nanopowder. The heat-treating of the surface treated porous substrate is, preferably, to be conducted in the presence of or under an inert gaseous atmosphere. Possible inert gases include nitrogen, helium, argon, neon and carbon dioxide. The preferred inert gas is nitrogen.

The temperature at which the heat treatment of the surface treated porous substrate is conducted should be such as to properly sinter the nanopowder layer. Thus, the sintering temperature used in conducting the heat treatment step will depend upon the particular metal or metal alloy or combination and ratios of alloyable metals of the nanopowder that has been applied to the surface of the porous substrate. But, generally, the heat treatment temperature should not exceed the melting temperature of either the porous substrate or the applied nanopowder, and, thus, the heat treatment temperature can be in the range of from 250° C. to 1825° C., more particularly, in the range of from 275° C. to 1800° C., and more specifically, from 280° C. to 1700° C.

It is an important feature of this invention that the sintering temperature used in the heat-treatment of the surface treated porous substrate is maintained below the melting temperature of the porous substrate. Thus, it is particularly desirable for the metal or metal alloy or alloyable metal nanopowder to have a melting temperature that is less than the melting temperature of the porous substrate. It is even more desirable for the Tamman temperature of the metal or metal alloy or alloyable metal nanopowder to have a Tamman temperature that is less than the Tamman temperature of the porous substrate. The unique attributes of the nanopowders contemplated for use in the invention provide for a lower heat-treatment temperature required to sinter the layer of nanopowder particles than is otherwise required to sinter powders of larger, micron-sized particles.

The inventive gas separation membrane may be used in the selective separation of a select gas from a gas mixture. The gas separation membrane is particularly useful in the separation of hydrogen from a hydrogen-containing gas stream, especially, in high temperature applications. One example of a high temperature application in which the inventive gas separation membrane can be used is in the steam reforming of a hydrocarbon, such as methane, to yield carbon monoxide and hydrogen, followed by the reaction of the yielded carbon monoxide with water in a so-called water-gas shift reaction to yield carbon dioxide and hydrogen. These catalytic reactions are equilibrium type reactions, and the inventive gas separation membrane can be useful in the simultaneous separation of the yielded hydrogen while conducting the reactions in order to enhance the equilibrium conditions to favor hydrogen yield. The reaction conditions under which the reactions are simultaneously conducted can include a reaction temperature in the range of from 400° C. to 1000° C. and a reaction pressure in the range of from 1 to 25 bar.

As already noted, the inventive gas separation membrane can be used in a wide variety of applications that involve the separation of hydrogen from gas streams that comprise other gases, for example, those selected from the group of gases consisting of carbon dioxide, water, methane or mixtures thereof. In such applications, the temperature conditions can be in the range upwardly to 800° C., for instance, in the range of from 100° C. to 800° C., and the pressure conditions can be in the range upwardly to 50 bar, for instance, in the range of from 1 to 40 bar.

The following Examples are provided to further illustrate the invention, but they are not to be construed as limiting the scope of the invention.

EXAMPLE I

This Example describes the manufacture of a gas separation membrane by the inventive method including the application of a layer of nanopowder to the surface of a porous substrate followed by the heat treatment of the thus-treated surface to provide a surface treated porous substrate that is itself heat-treated.

Several composite gas separation modules were prepared using a porous substrate support that was a 1-inch OD disk of 316 porous, stainless steel supplied by the Mott Corporation. The median pore diameter of the pores of the porous substrate support was in the range of from 2-5 μm. The porous substrate support was degreased and then tested to ensure its suitability for use in the experiment prior to the application of a silver nanopowder to its surface.

In the preparation of each of the two composite gas separation modules, a number of layers of a suspension of silver nanoparticle powder in a xylene solvent were applied to (deposited upon) the surface of each of the two porous substrate supports by means of a Maskless Mesoscale Material Deposition method similar to the method of depositing material to a target as described and claimed in U.S. Patent Application Publication No. US 2006/0008590 and in U.S. Pat. No. 7,045, 015.

The layers of nanoparticles were applied to the porous substrate supports under two different application conditions, with one of the substrate supports (Support A) having the nanoparticle suspension being applied under a so-called thick layer deposition condition and the other substrate support (Support B) having the nanoparticle suspension being applied under a so-called thin layer deposition condition.

The term thick layer deposition condition refers to the conditions by which the thickness of each of the several layers of nanoparticles that is applied to Support A is controlled to place thereon a thick layer of nanoparticles relative to the conditions by which the thickness of each of the several layers of nanoparticles that is applied to Support B is controlled to place thereon a thin layer of nanoparticles. Multiple thick layers of nanoparticles were applied to Support A, and, after the application of each layer, the coated Support A was sintered and the gas flux was measured by the methodology as described in Example II. Also, multiple thin layers of nanoparticles were applied to Support B, and, after the application of each layer, the coated Support B was sintered and the gas flux was measured as described in Example II.

The porous substrate supports were maintained at a temperature in the range of from 100° C. to 150° C. during the application or deposition of the nanoparticle suspension. The nanoparticle suspension was aerosolized and applied to the porous substrate support at a rate of from 20 to 40 cc/min and the flow rate of the annular inert sheath gas was about 25 cc/min. The print speed at which the aerosolized nanoparticle suspension was applied to the porous substrate support was from 5 to 10 mm/sec with a 150 μm raster. The print speed and flow rate of aerosol, together, were determinative of the application thickness of the nanoparticle layers to Support A and to Support B.

As already mentioned, after the application of each layer of nanoparticles, the coated porous substrate support was then subjected to a heat-treatment, or thermal sintering. The temperature at which the coated substrate was heated was in the range of from 250° C. to 325° C.

The gas flux provided by each of the aforementioned modules was measure by the method as more fully described in Example II after the application of each of the layers of nanoparticles and the heat treatment thereof.

EXAMPLE II

This Example II describes the testing method for determining the gas flux provided by each of the two gas separation modules of Example I, and it presents selected results from such testing.

A module was placed into a gas transport testing device for measuring gas flux. In this test, used at the upstream side of the module was nitrogen gas that was held at a pressure of 1 psig, and on the downstream side of the module was a flow meter for measuring gas flow of up to 1 liter/minute at a resolution of 0.1 ml/minute. This gas flow was passed through the module by placing it under the pressure of nitrogen gas.

The following Table 1 presents the measured leakage rate of nitrogen gas that is passed through the modules of Support A and of Support B having various numbers of nanoparticle layers that thereby provide various total thicknesses of deposited metal. The nitrogen leakage rates presented in Table 1 are for the coated Support A having the various total thicknesses of deposited nanoparticle metal that has been applied thereto using a thick layer deposition condition, and the nitrogen leakage rates for the coated Support B having the various thicknesses of nanoparticle metal that have been applied thereto using a thin layer deposition condition.

TABLE 1

Nitrogen Leakage Rates of Support A and of Support B Having Various Thicknesses of Nanoparticle Layers That Have Been Applied Thereto Using Either a Thick Layer Deposition Condition or a Thin Layer Deposition Condition.

| Support A (thick layer application) | | Support B (thin layer application) | |
|---|---|---|---|
| Wt of Ag Film (mg) | N2 Flow Rate (cc/min) | Wt of Ag Film (mg) | N2 Flow Rate (cc/min) |
| 0 | 275 | 0 | 275 |
| 16 | 75 | 4.5 | 100 |
| 21 | 1 | 6.5 | 10 |
| 24 | 0 | 9 | 0 |

FIG. 1 is provided to further illustrate the data that is presented in Table 1. It is significant to note that the layering of the porous substrate support with silver nanoparticles followed by heat treatment thereof provides a module that is reasonably gas tight in that the amount of gas that is transported across the module under the testing conditions indicated above is materially reduced below that which is transported across the untreated porous substrate under the same testing conditions. It is also recognized that, while the Support A module and the Support B module both can be made gas tight, the amount of silver placed on the Support B using the thin layer deposition condition is significantly less than the amount of silver that is placed on the Support A using the thick layer deposition condition. A gas tight, i.e. substantially no nitrogen gas flux through the gas membrane, is achieved with the Support B using the thin layer deposition condition with an approximately 7 micron layer thickness, but the thickness required to achieve a gas tight layer with Support A using the thick layer deposition condition was approximately 19 microns.

In a further, more qualitative testing of the modules, scan electron micrographs where made of four-layer and six-layer unsintered (non-heat treated) modules and sintered (heat-treated) modules to determine the effect of the heat treatment thereof. A visual observation of the surfaces indicated that they are significantly smoother as a result of the sintering and there are fewer, if any, residual pores.

The experiments presented in Examples I and II demonstrate that a gas tight and thin layer of a gas-selective, noble metal, such as silver, can be placed upon the surface of a porous substrate by the application of one or more nanopowder or particle layers of the noble metal thereto.

That which is claimed is:

1. A method of making a gas separation membrane, wherein said method comprises:

applying to a surface of a porous substrate a layer of a nanopowder, comprising nanoparticles of a gas-selective metal, to provide a surface treated porous substrate, wherein the method employed to apply said layer of nanopowder to the surface of said porous substrate comprises the steps of: aerosolizing a suspension of nanoparticles of the gas-selective metal within a liquid solvent, combining a flow stream of the thus-formed aerosol with an annular sheath gas flow, passing the thus-combined aerosol and flow stream through an extended nozzle, and focusing the thus-combined aerosol and flow stream upon the surface of the porous substrate to thereby apply a layer of nanoparticles of a gas-selective material to the surface of said porous substrate, said layer having a thickness of from 3 nm (0.003 μm) to 15 μm; and heating said surface treated porous substrate at a temperature maintained below the melting temperature of said porous substrate but sufficient to sinter said layer of nanopowder to provide a heat treated surface treated porous substrate with a sintered layer of gas tight, gas-selective nanopowder suitable for use as a gas separation membrane.

2. A method as recited in claim 1, wherein said porous substrate includes a porous foundation overlaid with an intermetallic diffusion barrier layer.

3. A method as recited in claim 2, further comprising:

coating said heat treated surface treated porous substrate with an overlayer of a gas-selective material to thereby provide a coated heat treated surface treated porous substrate.

4. A method as recited in claim 3, wherein said porous foundation comprises a porous metal material having a nickel content in an amount in the range of upwardly to 70 weight percent of the total weight of the porous metal material and a chromium content in the amount in the range of from 10 to 30 weight percent of the total weight of the porous metal material.

5. A method as recited in claim 4, wherein said intermetallic diffusion barrier layer comprises an intermetallic diffusion barrier material selected from the group consisting of alumina, silica, zirconia, titania, silicon carbide, chromium oxide, zeolites and refractory metals.

6. A method as recited in claim 5, wherein said porous substrate has a porous substrate thickness in the range of from 0.05 mm to 25 mm.

7. A method as recited in claim 2, wherein said intermetallic diffusion barrier layer has a diffusion barrier thickness in the range upwardly to 10 mm.

8. A method as recited in claim 7, wherein the pores of said porous metal material have a porous metal material median pore diameter in the range of from 0.1 μm to 15 μm, and wherein the pores of said intermetallic diffusion barrier material have a diffusion barrier material median pore diameter in the range of from 0.1 μm to 15 μm.

9. A method as recited in claim 8, wherein said nanoparticles of said nanopowder have an average particle size in the range of less than 400 nm.

10. A method as recited in claim 9, wherein said nanoparticles comprise a gas-selective metal selected from the group of metals consisting of platinum (Pt), palladium (Pd), gold (Au), silver (Ag), niobium (Nb), iridium (Ir), rhodium (Rh), ruthenium (Ru) and alloys of such metals.

11. A method as recited in claim 10, wherein said nanoparticles are further characterized as being alloyable.

12. A method as recited in claim 11, wherein said nanopowder has a nanopowder Tamman temperature less than the porous substrate Tamman temperature.

13. A method as recited in claim 12, wherein said layer of said nanopowder has a nanopowder layer thickness in the range of from 5 nm (0.005 μm) to 10 μm.

14. A method as recited in claim 13, wherein, in the heating step, said surface treated porous substrate is heated under an inert gaseous atmosphere.

15. A method as recited in claim 14, wherein said method employed to apply said layer of nanopowder to the surface of said porous substrate comprises the steps of:

aerosolizing a suspension of nanoparticles of the gas-selective metal within a liquid solvent, combining a flow stream of the thus-formed aerosol with an annular sheath gas flow, passing the thus-combined aerosol and flow stream through an extended nozzle, and focusing the thus-combined aerosol and flow stream upon the surface of the porous substrate to thereby apply a layer of nanoparticles of a gas-selective material to the surface of said porous substrate, said layer having a thickness of from 10 nm (0.010 μm) to 10 μm.

16. A gas separation membrane system, comprising: a porous substrate, having a surface that is treated with a layer of a nanopowder employing an application method comprising the steps of: aerosolizing a suspension of nanoparticles of the gas-selective metal within a liquid solvent, combining a flow stream of the thus-formed aerosol with an annular sheath gas flow, passing the thus-combined aerosol and flow stream through an extended nozzle, and focusing the thus-combined aerosol and flow stream upon the surface of the porous substrate to thereby apply a layer of nanoparticles of a gas-selective material to the surface of said porous substrate, said layer having a thickness of from 3 nm (0.003 μm) to 15 μm, and wherein said surface-treated porous substrate is heat-treated at a temperature maintained below the melting temperature of said porous substrate but sufficient to sinter said layer of nanoparticles to produce a sintered layer of gas tight, gas selective nanopowder, to provide said gas separation membrane system.

17. A gas separation membrane system as recited in claim 16, wherein said porous substrate includes a porous foundation overlaid with an intermetallic diffusion barrier layer.

18. A gas separation membrane system as recited in claim 17, wherein said surface treated porous substrate that has been heat-treated further includes an overlayer of a gas-selective material to thereby provide a coated heat treated surface treated porous substrate suitable for use as said gas separation membrane system.

19. A gas separation membrane system as recited in claim 18, wherein said porous foundation comprises a porous metal material having a nickel content in an amount in the range of upwardly to 70 weight percent of the total weight of the porous metal material and a chromium content in the amount in the range of from 10 to 30 weight percent of the total weight of the porous metal material.

20. A gas separation membrane system as recited in claim 19, wherein said intermetallic diffusion barrier layer comprises an intermetallic diffusion barrier material selected from the group consisting of alumina, silica, zirconia, titania, silicon carbide, chromium oxide, zeolites and refractory metals.

21. A gas separation membrane system as recited in claim 20, wherein said porous substrate has a porous substrate thickness in the range of from 0.05 mm to 25 mm.

22. A gas separation membrane system as recited in claim 21, wherein said intermetallic diffusion barrier layer has a diffusion barrier thickness in the range upwardly to 10 mm.

23. A gas separation membrane system as recited in claim 22, wherein the pores of said porous metal material have a porous metal material median pore diameter in the range of from 0.1 μm to 15 μm, and wherein the pores of said intermetallic diffusion barrier material have a diffusion barrier material median pore diameter in the range of from 0.1 μm to 15 μm.

24. A gas separation membrane system as recited in claim 23, wherein said nanoparticles of said nanopowder have an average particle size in the range of less than 400 nm.

25. A gas separation membrane system as recited in claim 24, wherein said nanoparticles comprise a gas-selective metal selected from the group of metals consisting of platinum (Pt), palladium (Pd), gold (Au), silver (Ag), niobium (Nb), iridium (Ir), rhodium (Rh), ruthenium (Ru) and alloys of such metals.

26. A gas separation membrane system as recited in claim 25, wherein said nanoparticles are further characterized as being alloyable.

27. A gas separation membrane system as recited in claim 26, wherein said nanopowder has a nanopowder Tamman temperature less than the porous substrate Tamman temperature.

28. A gas separation membrane system as recited in claim 27, wherein said layer of said nanopowder has a nanopowder layer thickness in the range of from 5 nm (0.005 μm) to 10 μm.

29. A gas separation membrane system as recited in claim 28, wherein, in the heating step, said surface treated porous substrate is heated under an inert gaseous atmosphere.

30. A gas separation membrane system as recited in claim 29, wherein the method employed to apply said layer of nanopowder to the surface of said porous substrate comprises the steps of: aerosolizing a suspension of nanoparticles of the gas-selective metal within a liquid solvent, combining a flow stream of the thus-formed aerosol with an annular sheath gas flow, passing the thus-combined aerosol and flow stream through an extended nozzle, and focusing the thus-combined aerosol and flow stream upon the surface of the porous substrate to thereby apply a layer of nanoparticles of a gas-selective material to the surface of said porous substrate, said layer having a thickness of from 10 nm (0.010 μm) to 10 μm.

31. A process for separating hydrogen from a hydrogen-containing gas stream, wherein said process comprises:

passing said hydrogen-containing gas stream over a gas separation membrane system, as recited in any one of claims 16 through 30, under temperature and pressure conditions such that hydrogen from said hydrogen-containing gas stream selectively passes through said gas separation membrane system.

32. A method as recited in claim 1, wherein the temperature at which the layer of nanopowder is applied to the surface of said porous substrate is 10 ° C. to 250 ° C.

33. A method as recited in claim 1, wherein the method employed to apply said layer of nanopowder to the surface of said porous substrate comprises:

aerosolizing a suspension of nanoparticles of the gas-selective metal within a liquid solvent;

combining a flow stream of the thus-formed aerosol with an annular sheath gas flow; passing the thus-combined aerosol and flow stream through an extended nozzle; and focusing the thus-combined aerosol and flow stream upon the surface of the porous substrate to thereby apply the nanopowder to the surface of said porous substrate, thereby producing a layer of nanoparticles of gas-selective material having a layer thickness of 10 nm (0.010 μm) to 10 μm.

34. A method as recited in claim 1, wherein the method employed to apply said layer of nanopowder to the surface of said porous substrate is maskless mesoscale material deposition using an aerosolized suspension of nanoparticles in a liquid.

35. A method as recited in claim 34, wherein said aerosolized suspension of nanoparticles is a suspension of silver nanoparticles in xylene.

36. A method as recited in claim 10, wherein the nanoparticles of a gas-selective metal is an alloy of palladium and silver.

37. A method as recited in claim 32, wherein multiple layers of nanoparticles are applied to the surface of the porous substrate and the porous substrate is heat treated after the application of each layer.

38. A gas separation membrane system as recited in claim 26, wherein the nanoparticles of a gas-selective metal is an alloy of palladium and silver.

* * * * *